Sept. 8, 1953  D. C. SURLES  2,651,541
VERTICALLY MOVABLE VEHICLE DOOR STRUCTURE
Filed Dec. 23, 1948  4 Sheets-Sheet 1
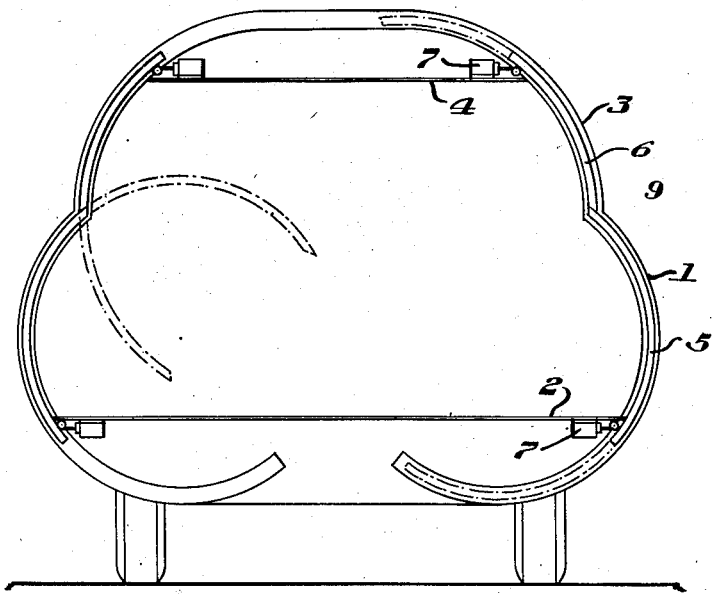
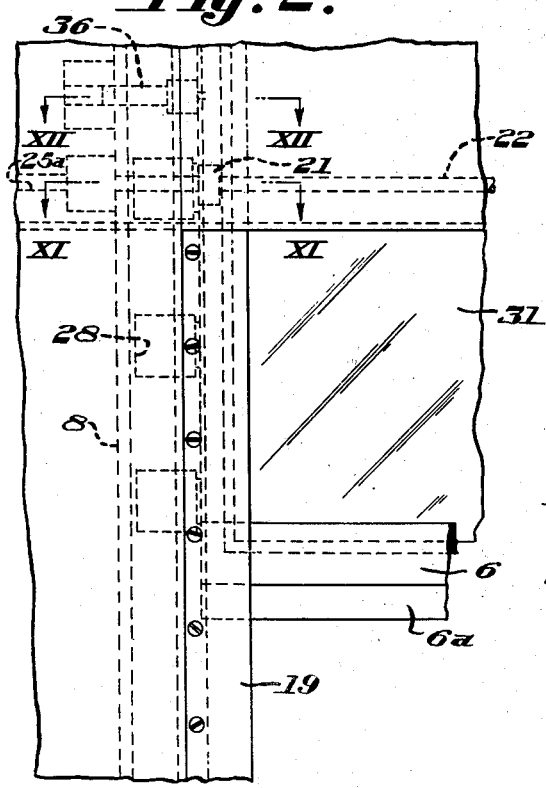
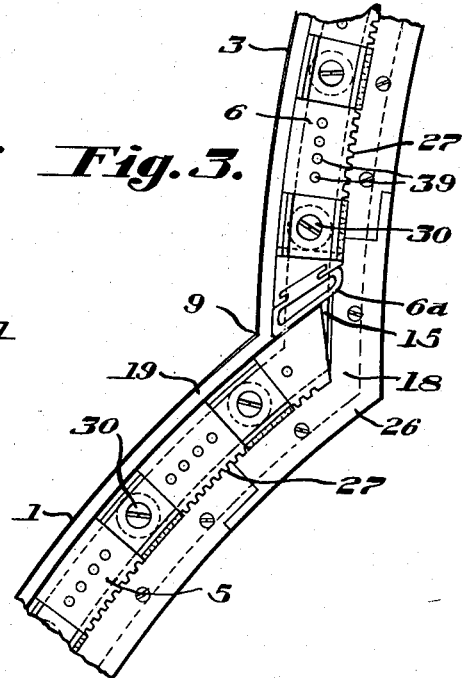
INVENTOR
DONALD C. SURLES

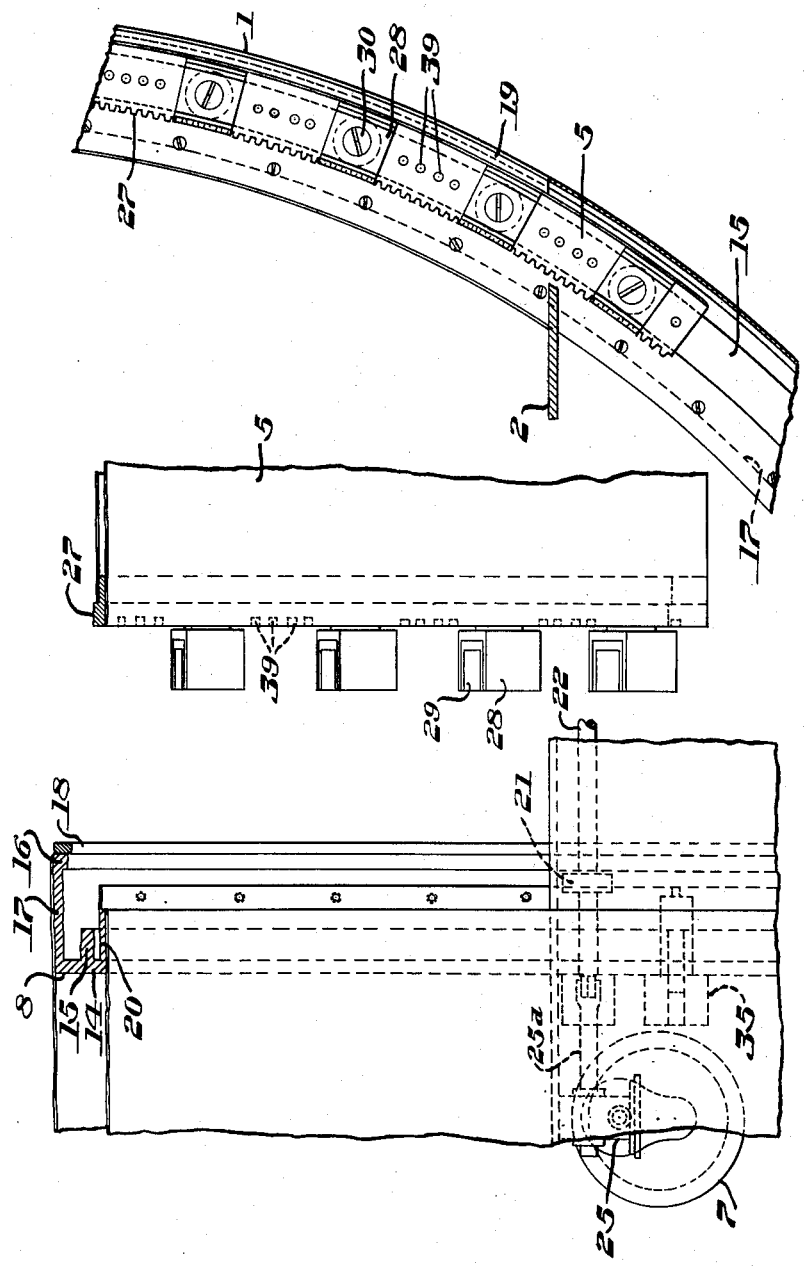

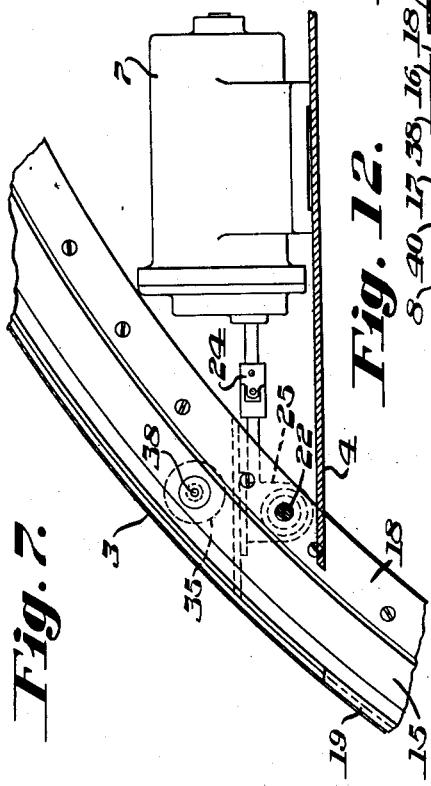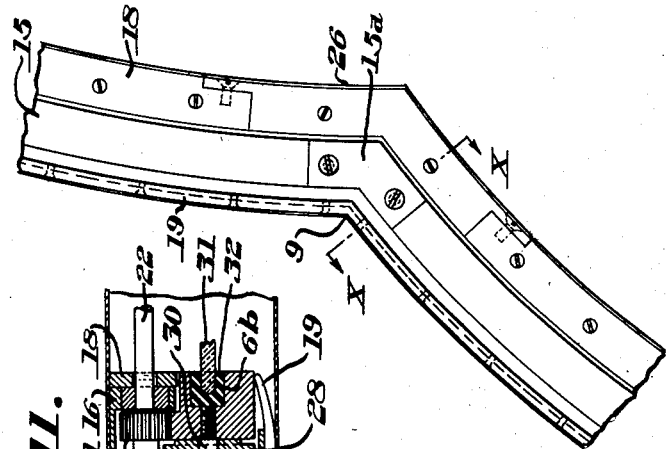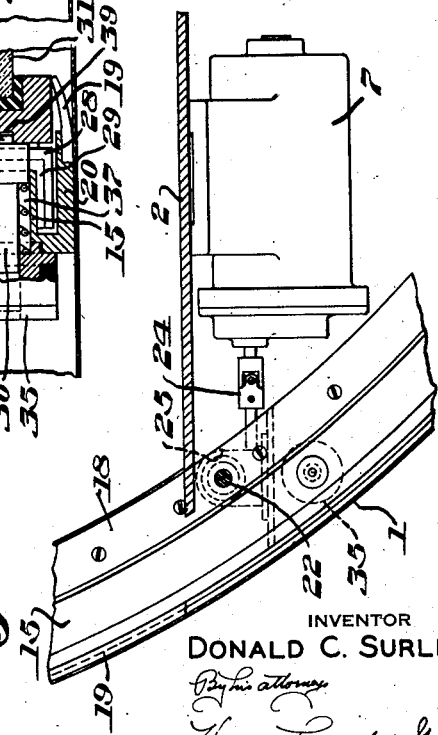

Sept. 8, 1953 D. C. SURLES 2,651,541
VERTICALLY MOVABLE VEHICLE DOOR STRUCTURE
Filed Dec. 23, 1948 4 Sheets-Sheet 4
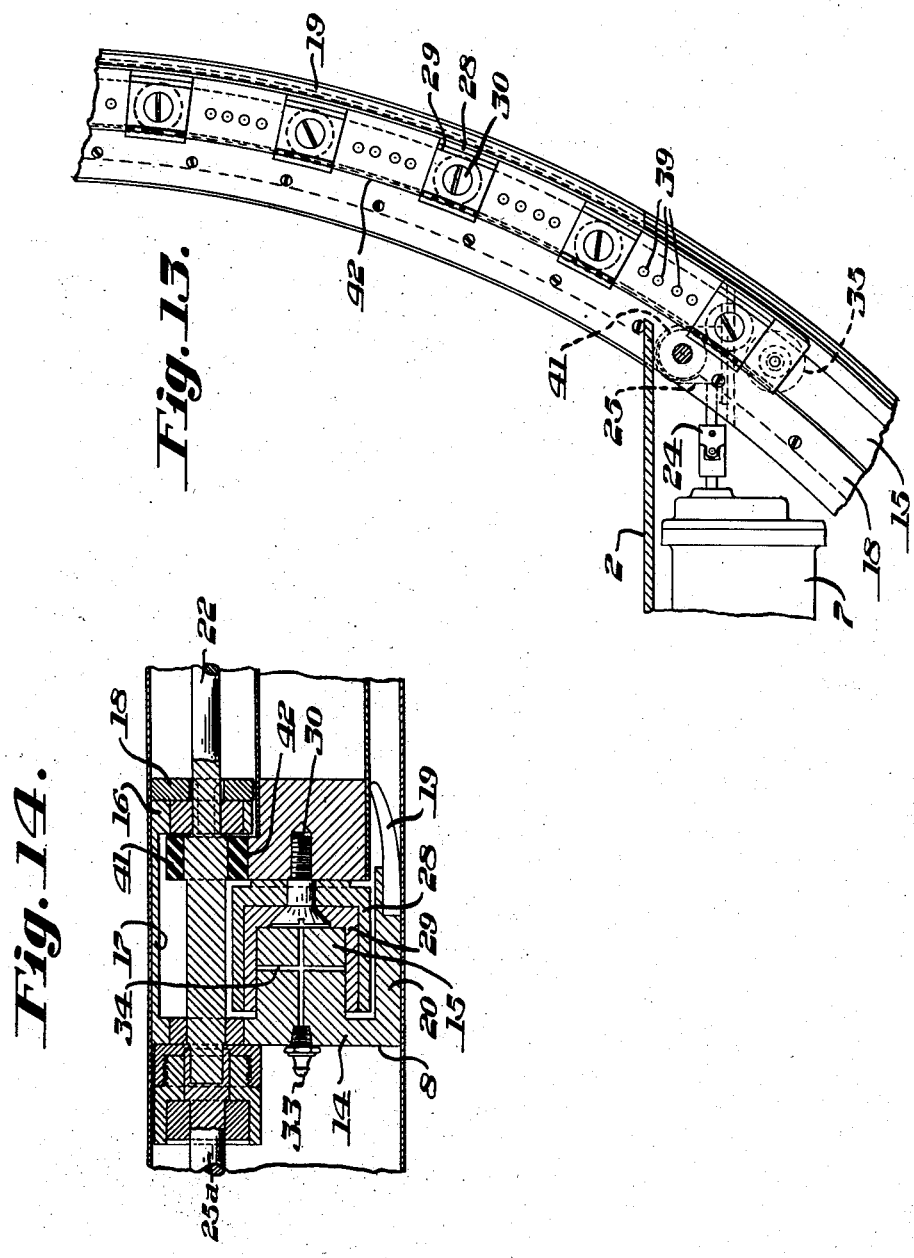
INVENTOR
DONALD C. SURLES Patented Sept. 8, 1953

2,651,541

UNITED STATES PATENT OFFICE 2,651,541

VERTICALLY MOVABLE VEHICLE DOOR STRUCTURE

Donald C. Surles, Cisco, Tex.

Application December 23, 1948, Serial No. 66,918

4 Claims. (Cl. 296—44)

1

My invention relates to door and body structures and more particularly to a door and body structure for automotive vehicles or the like.

It is conventional practice in automotive vehicles to hinge the doors to a vertically extending post which forms one side of a door opening in the side wall of the vehicle. The hinge post has been used at both the front and the rear of the door opening. In either case, however, there are many objections to this type of door structure. Such a door structure requires considerable free space at the side of the vehicle to permit the door to be opened. Moreover, when opened, the door is subject to being readily damaged by the wind or to being struck by another vehicle.

Conventional doors also obstruct the door opening preventing free ingress or egress from the vehicle and make loading or unloading of the vehicle difficult.

I have invented a door and body structure such that the door opening is unobstructed when the door is opened, and moreover, no free space to the side of the vehicle is required to permit its being opened.

The door and body structure of my invention comprises a body having a side wall and a body element extending inwardly therefrom so as to partially define a body interior and a rigid door movable up and down in guides along the vertically extending margins of a door opening in the side wall. The door guides commence at points spaced from the junction of the side wall and the body elements and are curved at least in part so that portions of the guides extend alongside the body element. Guide members on the door panel coact with the door guides to carry the door along the path of the guides. Means are provided for controlling the movement of the door panel in the guides. Locking means may also be provided for holding the door at fixed points along the guides.

In the accompanying drawings illustrating a preferred embodiment of the invention, Figure 1 is a section through an automotive vehicle showing the general arrangement of door panels according to my invention;

Figure 2 is a front elevation of an upper left-hand segment of a door opening and body structure of my invention with the upper panel in partially raised position;

Figure 3 is a side elevation of the junction of an upper and lower door according to my invention;

Figure 4 is a front elevation of a lower left-hand segment of a door opening and body structure of my invention with the resilient protective member removed.

Figure 5 is a front elevation of a segment of a lower door panel according to my invention;

Figure 6 is a section of a lower left-hand portion of the door and body structure showing the relationship of the body element;

Figure 7 is a section of an upper left-hand corner of the door opening and body structure showing a drive means for an upper door panel;

Figure 8 is a section of a lower left-hand corner of the door opening and body structure showing a drive means for a lower door panel;

Figure 9 is a side elevation of a body structure at the point of junction of an upper and lower side wall showing a removable marginal panel through which the door panels may be removed;

Figure 10 is a section on the line X—X of Figure 9;

Figure 11 is a section on the line XI—XI of Figure 2;

Figure 12 is a section on the line XII—XII of Figure 2;

Figure 13 is a section of a lower left-hand portion of a different embodiment of the door and body structure of my invention; and Figure 14 is a section of this embodiment on a line corresponding to Figure 11.

Referring first to Figure 1, I have illustrated a door and body structure for automotive vehicles consisting of lower side walls 1 and floor 2 and upper side walls 3 and ceiling 4. Lower door panels 5 are mounted in door openings in the lower side walls 1 and upper door panels 6 are mounted in door openings in the upper side walls 3. Each of the lower door panels 5 is adapted to move to a position beneath the floor 2 as shown in lower chain lines and each of the upper door panels 6 is adapted to move to a position above the ceiling 4 as shown in the upper chain lines. Both the upper and lower doors are removable from a point adjacent the junction of the lower side walls 1 and upper side walls 3 as illustrated in chain lines in Figure 1. Motors 7 adjacent the junction of side wall and body element (i. e. ceiling or floor) serve to move the doors within the side walls. A door guide 8 extends along each vertically extending margin of the door opening in both the upper and lower side walls. Each door guide commences at the junction 9 of the upper and lower side walls and curves inwardly so as to have a portion extending along a body element, which may be either the floor or the ceiling. The door guide consists of an outer generally U-shaped shell having in the center of its base 14 an inwardly extending portion 15 which forms a rail upon which a door panel travels. An inwardly projecting flange 16 on the inner leg 17 of the shell forms a guard member and a base upon which a finishing strip 18 may be applied. A resilient protective member 19 is attached to the outer leg 20 of the shell in frictional engagement with a door panel to seal the guide from dirt, moisture, etc. A pinion gear 21 is mounted within the shell of the door guide on a shaft 22 which is journaled through the base 14 and the flange 16 of the shell at a point adjacent the body element but outside the body interior. The shaft 22 extends along a side wall to the door guide on the opposite side of the door opening where it carries a similar pinion gear mounted within the shell of the door guide.

An electric motor 7 mounted on the body element is connected to the shaft 22 through a universal coupling 24, worm drive 25 and shaft 25a. This motor serves to drive the shaft 23 and pinion gears 21. The movement of the motor is controlled by conventional means mounted near the driver's seat.

A removable section 26 made up of portions 16a, 17a and 18a of the flange 16, finish strip 18 and inner leg 17 of the door guide 8 and a removable portion 15a of the rail 15 permits the installation and removal of door panels into the door guides.

Each of the door panels has a rack 27 along the two sides which abut the door guides 8. This rack is adapted to co-act with the pinion gears 21 in the door guides to control the movement of the door panel in the guides. Guide members 28 having an inner bearing surface 29 are spaced apart along the rack, as indicated in Figures 5 and 6, to engage the rail 15 of the door guide. Each of these guide members is rotatable about a fastening screw 30 so as to permit the door to follow the contour of the door guides without binding.

The upper door panel 6 carries a window 31 mounted in rubber or other resilient material 32 in a slot 6b surrounding the window opening in the door panel. A resilient seal 6a at the bottom of the panel engages a lower door panel when the upper and lower door panels are closed.

The lower door panel 5 is a plain panel having the general contour of the lower side wall 1.

The door guides may be lubricated as shown in Figure 11. A pressure lubrication fitting 33 is installed in the base 14 of the door guide and communicates with passages 34 which deliver lubricant to all sides of the door guide rail 15.

A locking device such as that illustrated in Figure 12 may be used to hold the door in fixed position in the door guides. A solenoid 35 mounted on the base 14 of the door guide has a spring loaded armature 36 which passes through a passage 37 in the guide rail 15. The end 38 of the armature 36 is adapted to enter spaced apart apertures 39 in the edge of the door panel between the guide members. Thus the door may be unlocked by energizing the solenoid coil or locked by deenergizing the coil whereupon the spring 40 forces the ends of the armature 36 into the aperture 39 in the door panel.

The door panels may be driven by a friction drive as illustrated in Figures 13 and 14 instead of a rack and pinion drive. A friction drive wheel 41 then replaces the pinion gear 21 on the shaft 22 and a friction surface 42 replaces the rack 27 on the door panel. The door panel is moved up and down along the door guide by the frictional engagement of the drive wheel 41 and the friction surface 42 on the edge of the door panel.

In moving any one of the door panels the motor which drives the particular door is energized to drive the shaft 22 through the worm gear 25. The rotating shaft 22 rotates the two pinions 21 which are mounted in the door guides 8 at each margin of the door opening. The pinions, which are in engagement with the rack gears 27 at each side of the door panel, cause the door panel to move along the rail 15 in the interior of the door guides on the guide members 28.

I have illustrated and described a present preferred embodiment of the invention, but it will be understood that it may be otherwise embodied within the scope of the following claims.

I claim:

1. In an automotive body including a bowed top, a floor and arcuate side walls joining the floor and top, said side walls each being formed from equal arcuate segments respectively of circles of equal circumferences having spaced centers lying in the same horizontal plane, each side wall and respective top portion having a door opening therein; an upper door panel closing the upper portion of each opening in the respective top portion and a lower door panel normally closing the lower portion of each opening in said side wall, each of said upper and lower door panels being independent of one another, said upper and lower door panels adapted to abut respectively at their inner edges when in their closed position; said upper door panels being slidable under the bowed top and the lower door panels being slidable under the floor to fully uncover the opening, the outer ends of said upper and lower door panels being in spaced relation when they are in their fully opened positions, each respective upper and lower door panel being independently slidable in arcs of different chords, means for actuating each upper door panel and independent means for actuating each lower door panel.

2. A door and body structure as claimed in claim 1 in which the means for actuating each upper door panel includes a driven friction disc engaging the surface of the door panel and the independent means for actuating each lower door panel includes a similar driven friction disc engaging the surface of the lower door panel.

3. A door and body structure as claimed in claim 1 in which the means for actuating each upper door panel includes gear racks at each side of the panel, said gear racks co-acting with pinion gears and the independent means for actuating each lower door panel includes similar gear racks at each side of the lower door panel, said gear racks coacting with driven pinion gears.

4. In an automotive body including a bowed top a floor and arcuate side walls joining the floor and top, said side walls being each formed from two arcuate segments one above the other, the corresponding segments of each side wall being formed from equal arcuate segments of circles of equal circumference having spaced centers lying in the same horizontal plane, a door opening in each side wall segment, an upper door panel closing the opening in each upper segment, a lower door panel closing the opening in each lower segment, each of said upper and lower door panels being independent of one another, said upper and lower door panels adapted to abut respectively at their inner edges when in their closed position, said upper door panels being slidable beneath the bowed top and the lower door panels being slidable beneath the floor to fully uncover the opening, the outer ends of the upper and lower door panels being in spaced relation when they are in their fully opened positions, each respective upper and lower door panel being independently slidable in arcs of different chords, means for actuating each upper door panel and independent means for actuating each lower door panel.

DONALD C. SURLES.

References Cited in the file of this patent

UNITED STATES PATENTS

| Number | Name | Date |
|---|---|---|
| 498,071 | Moore | May 23, 1893 |
| 598,842 | Barton | Feb. 8, 1898 |
| 649,804 | Burger et al. | May 15, 1900 |
| 707,018 | Romunder | Aug. 12, 1902 |
| 1,146,873 | Hechler | July 20, 1915 |
| 1,180,730 | Masury | Apr. 25, 1916 |
| 1,193,707 | Masury | Aug. 8, 1916 |
| 1,325,790 | Kleinschmidt | Dec. 23, 1919 |
| 1,642,971 | Rystedt | Sept. 20, 1927 |
| 2,160,099 | Zeligman | May 30, 1939 |
| 2,214,722 | De Seversky | Sept. 10, 1940 |
| 2,519,386 | Loving | Aug. 22, 1950 |
| 2,548,950 | Coles | Apr. 17, 1951 |

FOREIGN PATENTS

| Number | Country | Date |
|---|---|---|
| 225,087 | Switzerland | Apr. 1, 1943 |